Aug. 10, 1965    N. H. LIEB ETAL    3,199,196
DENTAL HANDPIECE
Filed Nov. 19, 1962    2 Sheets-Sheet 1
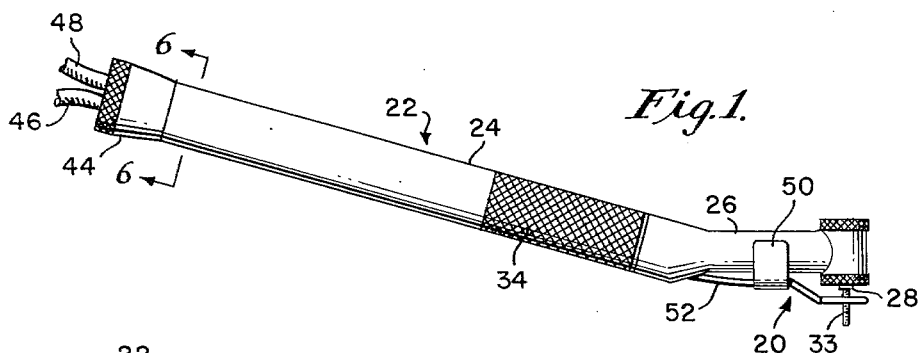
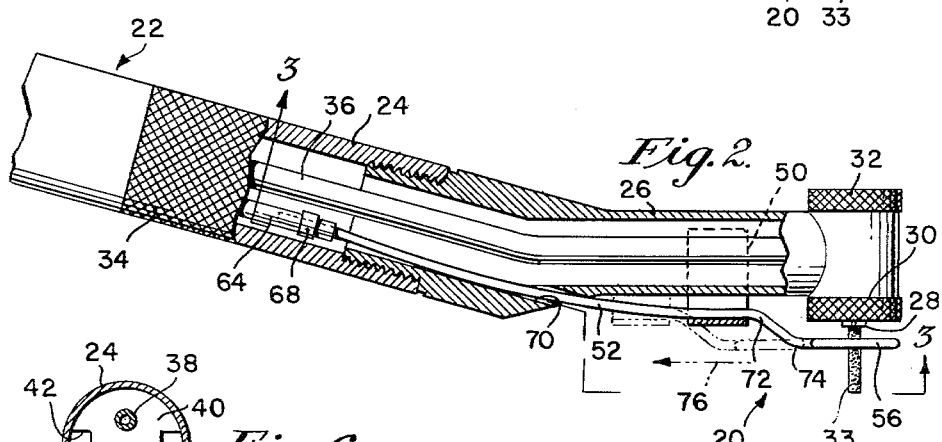
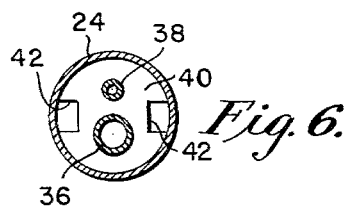
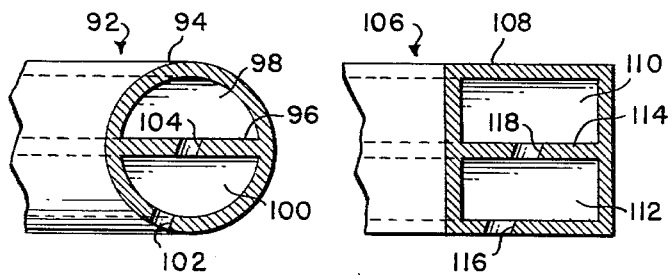
INVENTORS.
ANTHONY J. TURCHI
BY NATHANIEL H. LIEB
Caesar and Rivise
ATTORNEYS.

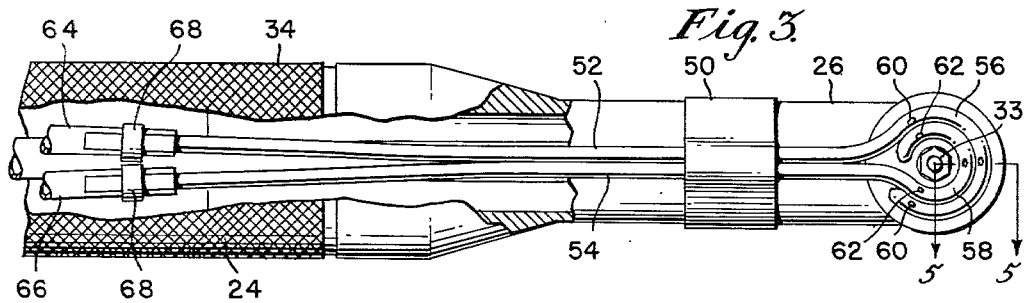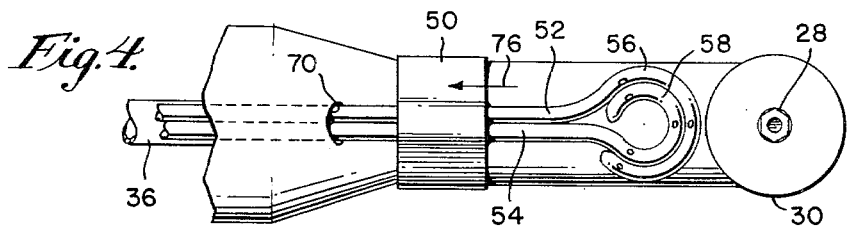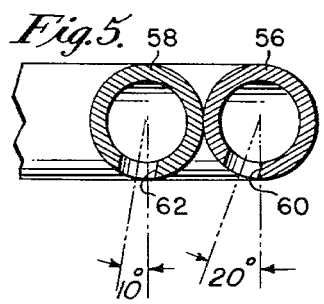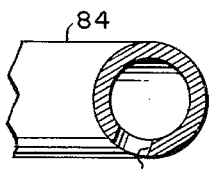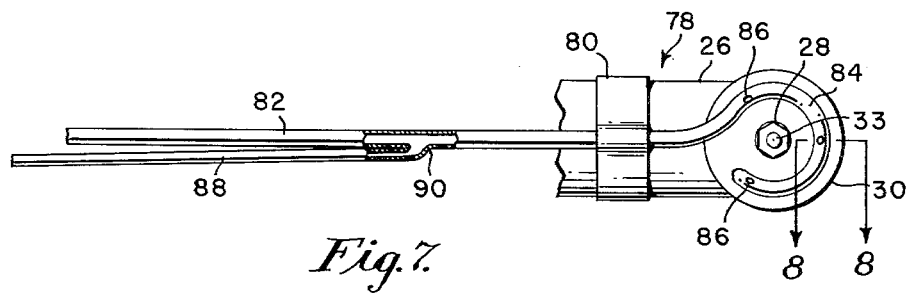

United States Patent Office 3,199,196
Patented Aug. 10, 1965

3,199,196
DENTAL HANDPIECE
Nathaniel H. Lieb, Philadelphia, and Anthony John Turchi, Bala Cynwyd, Pa., assignors to Star Dental Manufacturing Co., Inc., also known as Star Dental Manufacturing Company, Inc., and Star Dental Mfg. Co., Inc., Philadelphia, Pa., a corporation of Pennsylvania
Filed Nov. 19, 1962, Ser. No. 238,470
8 Claims. (Cl. 32—27)

This application is a continuation-in-part of our co-pending application Serial No. 822,131, filed June 22, 1959, now Patent No. 3,074,167.

This invention relates to a spray clip and has as an object the provision of a novel adjustable device for delivering a fluid spray to a tooth during the drilling thereof.

It is known to supply the necessary rotative power to a dental bur by means of a round belt pulley system operatively connected to a source of power. Recently, the demands of high speed dentistry have improved these round belt systems and provided other systems such as air and water driven turbines, to effect dental cutting tool speeds of 200,000 to 300,000 r.p.m.

The use of these high speed systems has resulted in another problem, that of the generation of large amounts of frictional heat in a tooth. It has therefore become necessary to cool the tooth during the drilling thereof. The method of cooling which is used almost exclusively is that of directly supplying a water spray against the tooth while the drilling is being carried out.

Although it has been found that water will effectively cool the tooth, various problems have arisen with prior art water sprays. In the prior art devices the spray head for the water is at a fixed point and is not adjustable. On many occasions, when a single stream of water was supplied, either a dental bur or a portion of the tooth would block the immediate area where the drilling was taking place. Thus, a large amount of frictional heat might be developed in a given area thereby destroying the vitality of the tooth.

In other cases water was supplied under pressure and applied directly to the tooth. However, in many of these cases it was found that the pressure was insufficient and the amount of water supplied was inadequate. Furthermore, on supplying water in this form, on many occasions it came out as a stream rather than as a spray and was immediately deflected by the rotating bur.

All of the prior art problems involved with supplying water to a tooth have been overcome by this invention. The spray clip of this invention is adjustable, thereby making it possible to vary the positioning of the water spray in order to insure that the drilled area is completely contacted. Also, the spray clip of this invention includes a plurality of spray heads which will result in a complete shower bath on the tooth, thereby insuring adequate cooling. Furthermore, the spray clip of this invention can be used with a combination of air and water to insure complete atomization of the water, thereby eliminating any possibility of the rotating bur's deflecting the water as it is directed toward the tooth.

It is therefore an object of this invention to provide a novel spray clip.

It is another object of this invention to provide a spray clip which can deliver either water alone, air alone or a water and air mixture to the tooth.

It is a further object of this invention to provide a spray clip which is adjustable on a dental handpiece.

It is yet a further object of this invention to provide a spray clip which will deliver a shower bath to the tooth which will completely encompass the drilled area.

These and other objects are accomplished by providing a dental handpiece including a body member, a rotary chuck in one end of said body member, spray means associated with said body member, said spray means including a collar adjustably mounted on said body member and tube means secured to said collar, said tube means having at least one opening therein for delivering a fluid to a tooth when said tooth is being treated.

Other objects and many of the attendant advantages of this invention will be readily appreciated as the same becomes better understood by reference to the following detailed description when considered in connection with the accompanying drawings wherein:

FIG. 1 is a side elevational view of a complete dental handpiece embodying the present invention.

FIG. 2 is an enlarged side elevational view of a portion of the handpiece shown in FIG. 1 partly broken away to show the interior of said handpiece.

FIG. 3 is an enlarged sectional view taken along the line 3—3 of FIG. 2 and showing one embodiment of the spray clip of this invention.

FIG. 4 is a bottom view of the spray clip shown in FIG. 3, but showing the clip in its retracted position.

FIG. 5 is an enlarged sectional view taken along the line 5—5 of FIG. 3.

FIG. 6 is an enlarged sectional view taken along the line 6—6 of FIG. 1.

FIG. 7 is a bottom view similar to FIG. 4, but showing a modified form of the spray clip of this invention.

FIG. 8 is an enlarged sectional view taken along the line 8—8 of FIG. 7.

FIG. 9 is a cross sectional view similar to FIGS. 5 and 8, showing another modified form of the spray tubes of this invention.

FIG. 10 is a cross sectional view similar to FIG. 9, but showing yet another modified form of the spray tubes of this invention.

Referring now in greater detail to the various figures of the drawings wherein similar reference characters refer to similar parts, a spray clip embodying the present invention is shown generally at 20 in FIG. 1.

Device 20 is mounted on a conventional dental handpiece shown generally at 22. Handpiece 22 includes a hollow tubular body member 24 having one end 26 projecting angularly from the remainder of said body member in substantially a horizontal plane. Mounted within end 26 is a rotary chuck 28 (outwardly projecting end showing in FIGS. 1, 2 and 4) which is held in place by end caps 30 and 32. Examples of suitable chucks are shown in my co-pending applications Serial No. 822,131, filed June 21, 1959 and Serial No. 138,522, filed September 15, 1961, now Patent No. 3,120,706. A dental bur 33 is shown mounted within the chuck. Body member 24 is provided with a knurled surface 34 on a portion thereof to facilitate gripping thereof.

A conduit 36 extends along the length of body member 24. This conduit supplies the air for rotating an air turbine on rotary chuck 28, as explained in my aforementioned co-pending applications. Conduit 36 additionally supplies the air for spray clip 20, as will be explained hereinafter. A second conduit 38 (FIG. 6) is also provided in body member 24. This conduit is used for supplying water to spray clip 20. As seen in FIG. 6, conduits 36 and 38 are maintained in a spaced relationship within the body member 24 by grommet 40, through which the conduits pass. Grommet 40 is additionally provided with openings 42 to exhaust the air from the turbine on rotary chuck 28. An end cap 44 is threadedly secured on the end of body member 24. Flexible tubes 46 and 48 are connected to conduits 36 and 38, respectively.

Spray clip 20 includes a resilient collar 50 which is slidably mounted on body member 24. Collar 50 is preferrably made of spring steel and resiliently grips the body member. A pair of parallel tubes 52 and 54 are secured to the bottom of collar 50, as by soldering (FIGS. 3 and 4). One end of tube 52 is bent arcuately at 16, thereby forming a substantial portion of a circle. The adjacent end 58 on tube 54 is also bent arcuately, but with a smaller radius, and also forming a substantial portion of a circle. The net effect of the two radial bends is the formation of a pair of concentric rings, as seen in FIGS. 3 and 4. Ring 56 is provided with a plurality of inwardly projecting holes 60. Ring 58 is also provided with a plurality of inwardly projecting holes 62 which are aligned with holes 60. In a preferred, but not limited embodiment, holes 62 project inwardly 10° from the vertical and holes 60 project inwardly 20° from the vertical, as seen in FIG. 5.

Tube 52 is connected to water inlet tube 38 by means of flexible tubing 64. Likewise, tube 54 is connected to a branch tube from air tube 36 by means of flexible tubing 66. Suitable collars 68 may be used to secure the flexible tubing to tubes 52 and 54.

Tubes 52 and 54 pass from the inside of body member 24 through a hole 70. These tubes are provided with a pair of bends 72 and 74 at the forward end thereof. The purpose of the bends is to lower the level of spray rings 56 and 58 in order that they may encompass dental bur 29. In the prior art spray devices the spray heads terminate short of the rotary chuck and were sprayed at the tooth from a greater distance.

In use, tube 52 delivers water to the area of the tooth and rotating bur 29 through holes 60. Likewise, tube 54 delivers air to the tooth and rotating bur through holes 62. The mixture of the air and water exiting through holes 60 and 62 atomizes the water and increases the pressure thereof. By spacing the holes completely around the rotating bur, the drilled area is given a complete shower bath. Furthermore, angling holes inwardly further insures the drilled area will be completely covered by water.

Since collar 50 is slidable on body member 24, it is possible to adjust the spray head relative to the dental bur. Since the diameter of bur 33 is much smaller than the diameter of ring 58, there is a substantial amount of room for adjustment. If it is desired to remove the chuck from the chuck housing, it is merely necessary to first remove bur 33 from the chuck and slide the entire spray clip in the direction of arrow 76 to the position shown in phantom in FIG. 2. It is then a relatively simple matter to remove end caps 30 and 32 and remove the rotary chuck and its associated turbine from body member 24. The position shown in phantom in FIG. 2 is also shown in FIG. 4 in solid line.

Another embodiment of the spray clip of this invention is generally shown at 78 in FIG. 7. In this embodiment there is also provided a resilient collar 80 which slidably engages end portion 26 of body member 24. Tube 82 is secured to collar 80. This tube also includes a radial bend 84 having a plurality of holes 86 therein. As seen in FIG. 8, holes 86 are also angled inwardly toward dental bur 33.

Tube 82 is connected to water supply conduit 38 by means of flexible tubing, in the manner described above. A second tube 88 is tapped into the side of tube 82 at a point 90 which is located just ahead of collar 80. Thus, it is seen in this embodiment the air and water are mixed prior to their emergence from the spray head, whereas in the previous embodiment the mixture does not occur until after emergence from the respective spray heads of the water and air. In the embodiment of FIGS. 7 and 8 the air is under sufficient pressure to finely atomize the water.

In FIG. 9 there is generally shown another embodiment 92 of a spray tube. In this embodiment there is provided a unitary circular tube 94 having a horizontal partitioning wall 96 extending along the entire length thereof. Wall 96 separates tube 94 into a pair of isolated channels 98 and 100. Tube 94 is provided with a radial bend similar to bend 84 shown in FIG. 7. The lower wall of tube 94 and wall 96 are each provided with a plurality of aligned holes 102 and 104 respectively. As in the case of the other embodiment these holes project inwardly toward the dental bur.

In use, the water line 38 is tapped into channel 98 and air line 36 is tapped into channel 100. Suitable flexible tubes are again used in the connection. Likewise, a collar similar to collar 50 or 80 is secured to spray device 92. The water in channel 98 and the air in channel 100 are mixed as the water exists through holes 104. The mixture is then atomized through holes 102 and sprayed onto the drilled portion of the tooth.

A fourth embodiment of the spray device of this invention is generally shown at 106 in FIG. 10. Device 106 includes square tubing 108 partitioned into channel 110 and 112 by wall 114. Spray device 106 is also provided with a plurality of aligned holes 116 and 118 similar to holes 102 and 104 in device 92. Thus, device 106 differs from device 92 only in the fact that the tubing in the former is square, whereas the tubing in the latter is circular. The use of the two devices is identical.

The spray clips of this invention can be made of numerous materials well-known to the art. However, for the sake of appearance and durability, stainless steel tubing is preferred. The flexible tubing connecting the spray device with the air and water conduits can be made from flexible plastics and rubber. An example of a flexible plastic tubing that can be used is that sold under the trademark Tygon.

Although the devices have been described as showing air passing through one tube and water through the other, they will work equally well by reversing this arrangement. However, in the device shown in FIGS. 7 and 8, it has been found that the spray is more finely atomized if the water passes through the larger diameter tube 82 and the air through the smaller diameter tube 88. By the use of suitable controls, the spray clip of this invention can be used to deliver air, water or a mixture of air and water to a tooth.

Although the spray device has been described specifically for use with an air driven dental drill, it can be used equally well with a water driven, belt driven and electrically driven drill.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a dental handpiece including a hollow body member, a rotary chuck in one end of said body member, a conduit within said body member for delivering a liquid and a conduit within said body member for delivering a gas, spray means associated with said body member, said spray means including a collar slidably mounted on said body member and tube means secured to said collar, said tube means having at least one opening therein for delivering fluid to a tooth in the area adjacent a dental bur secured in said rotary chuck, said tube means being connected to said liquid and air conduits by flexible tubing whereby said tube means may be slid into and out of the area adjacent said dental bur by sliding said collar.

2. The invention of claim 1 wherein said tube means includes an end portion which is arcuately bent to surround a dental bur which is secured in said rotary chuck.

3. The invention of claim 2 wherein said arcuately bent portion has a plurality of openings therein for delivering fluid.

4. The invention of claim 3 wherein said openings are formed in such a manner as to direct the fluid emanating therefrom inwardly toward the dental bur.

5. The invention of claim 1 wherein said tube means comprises a first tube and a second tube, each of said tubes having an arcuately bent end portion with the bent portion of one of said tubes encircling the bent portion of the other of said tubes, said bent portions having a plurality of aligned holes formed therein for delivering the fluid to a tooth.

6. The invention of claim 5 wherein one of said tubes is flexibly connected to said conduit for delivering gas and the other of said tubes is flexibly connected to a conduit for delivering said liquid.

7. The invention of claim 1 wherein said tube means includes a first tube having an arcuately bent end portion, said end portion having a plurality of openings formed therein, and a second tube tapped into said first tube, one of said tubes being flexibly connected to said conduit for delivering gas and the other of said tubes being flexibly connected to said conduit for delivering a liquid.

8. The invention of claim 1 wherein said tube means includes a tube having an arcuately bent end portion, said tube being partitioned into two individual channels, one of said channels being flexibly connected to said conduit for delivering a gas and the other of said channels being connected to said conduit for delivering liquid, said tube having a plurality of holes formed therein for delivering said fluid to a tooth, with a plurality of aligned holes being formed in the means partitioning said tube into the two channels.

References Cited by the Examiner
UNITED STATES PATENTS

| | | | |
|---|---|---|---|
| 2,459,573 | 1/49 | Morrow | 32—28 |
| 2,557,377 | 6/51 | Ganz | 32—28 |
| 3,061,930 | 11/62 | Borden. | |

FOREIGN PATENTS 717,850  11/54  Great Britain.

RICHARD A. GAUDET, *Primary Examiner.*

ROBERT E. MORGAN, *Examiner.*